United States Patent
Yasuda

[11] 3,946,289
[45] Mar. 23, 1976

[54] SOLID ORGANIC SEMICONDUCTOR ELECTROLYTE CAPACITOR HAVING A CO-POLYMER BINDER

[75] Inventor: Masahito Yasuda, Kawasaki, Japan

[73] Assignee: Matsushita Electric Industrial Company, Limited, Japan

[22] Filed: Aug. 14, 1974

[21] Appl. No.: 497,373

[30] Foreign Application Priority Data
Aug. 16, 1973 Japan............................. 48-92198

[52] U.S. Cl. ............................. 317/230; 252/62.2
[51] Int. Cl.² ......................................... H01G 9/00
[58] Field of Search..................... 317/230; 252/62.2

[56] References Cited
UNITED STATES PATENTS

| | | | |
|---|---|---|---|
| 3,656,027 | 4/1922 | Isley..................................... | 317/230 |
| 3,679,944 | 7/1972 | Yoshimura et al. ................. | 317/230 |
| 3,709,820 | 1/1973 | Yoshimura et al. ................. | 317/230 |
| 3,709,821 | 1/1973 | Yoshimura........................... | 317/230 |
| 3,766,443 | 10/1973 | Asakawa et al..................... | 317/230 |
| 3,812,039 | 5/1974 | Niwa.................................... | 317/230 |
| 3,835,055 | 9/1974 | Chesnot............................... | 317/230 |
| 3,872,358 | 3/1975 | Murakami et al. .................. | 317/230 |

*Primary Examiner*—Andrew J. James
*Attorney, Agent, or Firm*—Robert E. Burns; Emmanuel J. Lobato; Bruce L. Adams

[57] ABSTRACT

A solid electrolyte layer formed between the anodic dielectric oxide film and the counter electrode is composed of a 7,7,8,8-tetracyanoquinodimethane salt of the charge transfer compound type and a binary copolymer. The major component of the copolymer is a nitrogen-containing compound of which polymer is capable of dissolving the salt and the other component is a customary compound capable of forming a strongly adhesive polymer.

9 Claims, 6 Drawing Figures

SOLID ORGANIC SEMICONDUCTOR ELECTROLYTE CAPACITOR HAVING A CO-POLYMER BINDER

FIELD OF THE INVENTION

This invention relates to a solid electrolyte capacitor having an anodically formed dielectric oxide film and an electrolyte coating formed thereon and composed of an organic semiconductive material and a binder.

BACKGROUND

A thin oxide film formed on a film-forming metal or valve metal such as aluminum and tantalum by anodic oxidation of the metal serves as a dielectric of a solid capacitor. As is well known in the art, such a film possesses essentially eminent dielectric characteristics, but practically it cannot be devoid of considerable faults and micropores developed during and/or after anodization. As a result, dielectric characteristics and leakage current of a capacitor utilizing an anodized oxide film always remain below the levels expected from the values inherent to an ideal oxide film. An electrolyte disposed between the dielectric oxide film and a counter electrode of a practical electrolyte capacitor, therefore, is required to have a function of electrolytically oxidizing the anode in the case of polarization thereof to reform the defective oxide film apart from its principal function as a substantial cathode.

Manganese dioxide is the most familiar solid electrolyte now in practical use. According to generally accepted explanations for the function of manganese dioxide to reduce the leakage current of a capacitor, faults in the dielectric oxide film may be healed by oxygen liberated from polarized manganese dioxide, and/or manganese dioxide may be reduced to a lower and non-conducting oxide due to high temperatures produced by high density of currents through the faults.

There is, however, a significant problem in forming a manganese dioxide coating on an anodized valve metal, viz., a thermal treatment at considerably high temperatures is required. For example, thermal decomposition of manganese nitrate to the dioxide is usually carried out at temperatures between 200° and 400°C. Besides, application of the nitrate solution and thermal decomposition thereof must be repeated several times in order to form a dense and closely adhered manganese dioxide coating. The multiple exposure to the high temperatures inevitably damages the inherently feeble dielectric oxide film and results in unsatisfactory characteristics of the produced capacitor. Accordingly it is necessary to provide repeated steps of re-anodizing between and after the heating steps. A capacitor produced by such complicated procedures has nevertheless shortcomings such as a relatively large leakage current and a relatively low maximum operating voltage.

Various organic semiconductive substances have been proposed to replace manganese dioxide and thereby to eliminate the above drawbacks. Examples of organic semiconductive substances promising as solid electrolyte material for their good anodical oxidizing prroperties are some charge transfer complex compounds the acceptor of which is a nitro compound or a quinolinium compound. Another group of organic semiconductive compounds featuring superior anodizing capability is a group of salts having 7,7,8,8-tetracyanoquinodimethane, hereinafter referred to as TCNQ for brevity, as the anion component. Solid electrolyte capacitors based on these organic semiconductive compounds are described, e.g. in U.S. Pat. No. 3,586,923. These compounds can be coated on an anodic oxide film without requiring high temperatures and hence scarcely damage the oxide film and exhibit better anodizing or reforming properties than manganese dioxide.

It is now beyond doubt that organic semiconductive compounds of the charge transfer complex type and especially some salts of TCNQ serve, at least theoretically, as advantageous electrolytes for solid electrolyte capacitors, but improved capacitors of practical use can be obtained only when a practical method of coating such a compound on the dielectric oxide film is established. The method is required to give a dense, uniform and strongly adhering coating without injuring the inherent property of the compound or its ability to reform an anodic oxide film.

At first, application of an organic solvent solution of a TCNQ salt was proposed, e.g., by U.S. Pat. Nos. 3,214,648 and 3,214,650. Although the method is quite easy to carry out, such a method usually fails in providing the desired degree of density and adhesion strength of the resulting coating. Next, a semiconductive polymer or a polymer capable of dissolving a semiconductive salt has been sought, and U.S. Pat. Nos. 3,424,698 and 3,483,438 disclose some polymers which dissolve TCNQ and its salts and electrolyte capacitors based on such polymers, respectively. A problem with respect to the polymers according to these patents resides in that relatively large amounts of the polymer are required to obtain an electrolyte coating of such denseness and adhesion as to ensure the desired level of stability and life of the resulting capacitor. In the capacitors of U.S. Pat. No. 3,483,438, for example, a polymer content of far more than 50% by weight is necessary to prepare an electrolyte system in which a TCNQ salt is dissolved up to saturation.

The smaller the amount of polymer binder in an electrolyte system, the better for obtaining a capacitor of excellent characteristics, because the capacitor characteristics are substantially determined by the physical properties of the polymer itself when a large amount of polymer is used. Practical disadvantages resulting from a large polymer content in the electrolyte layer of a solid capacitor are as follows:

1. increase in the specific resistance of the electrolyte and hence increase in the dielectric loss of the capacitor;
2. decrease in the capacitance of the capacitor;
3. deterioration in the anodizing property and dielectric strength; and
4. deterioration of the capacitor due to expansion of the polymer. These disadvantages may be reduced to permissible levels if the polymer content is limited to 40% by weight at most.

OBJECTS OF THE INVENTION

It is accordingly a major object of the present invention to provide an improved solid electrolyte capacitor, which has an electrolyte layer containing a relatively small amount of a polymer binder and hence is devoid of shortcomings of prior art capacitors.

It is another object of the invention to provide an improved solid electrolyte capacitor which is stable and long-living over a wide temperature range.

It is still another object of the invention to provide a solid electrolyte capacitor which exhibits excellent characteristics, particularly as regards dielectric loss, leakage current and frequency response of impedance.

THE INVENTION

In general, the invention relates to a solid electrolyte capacitor of a known construction having a dielectric oxide film formed on a valve metal anode, a counter electrode and a solid electrolyte layer formed between and in intimate contact with both electrodes, which electrolyte contains a semiconductive TCNQ salt and a binder. According to the invention, the binder is an organic copolymer of a major amount of first component and a minor amount of a second component, wherein the polymer of the first component is capable of dissolving the TCNQ salt and the polymer of the second component has a strong adhering property to the dielectric oxide film.

The copolymer content in the electrolyte lies preferably in a range between 5 to 40% by weight. A few examples of preferred copolymers are those of vinyl pyrrolidone/vinyl acetate and acrylonitrile/butadiene.

DESCRIPTION OF THE DRAWINGS

Other features and advantages of the invention will become apparent from the following detailed description taken in conjunction with the accompanying drawings, in which.

Figure 1:
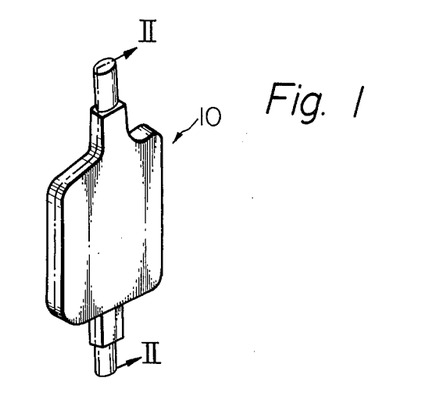
FIG. 1 is a perspective view of a solid electrolyte capacitor according to the invention.
Figure 2:
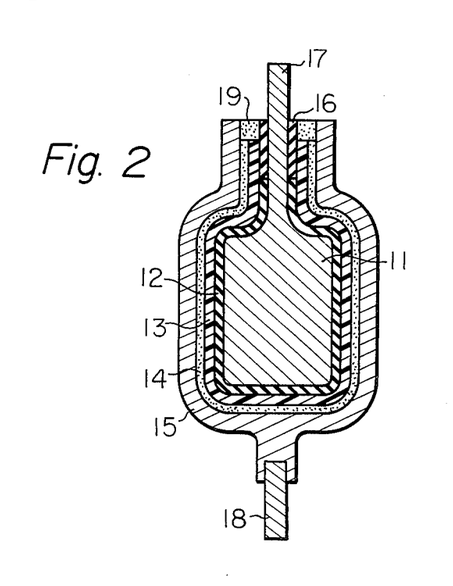
FIG. 2 is a vertical section taken on line 2—2 of FIG. 1.

A solid electrolyte capacitor 10 according to the invention shown in FIGS. 1 and 2 by way of example is fundamentalily of a similar construction to the prior art capacitors utilizing an organic solid electrolyte. An anode 11 is a foil of a valve metal such as, e.g., aluminum, tantalum or titanium and has a thin and dense dielectric film 12 formed thereon by anodic oxidation. The surface of the anode 11 may be etched before anodization to obtain the dielectric oxide film 12 of good quality as is well known in the art. The entire surface of the oxide film 12 is covered with a coating of an organic solid electrolyte 13, which will be described hereinafter in more detail. The coating 13 is electrically in contact with and physically fixed to a metal case 15 having an integral cathode lead 18 by means of a conventional conductive and adhesive material 14 such as a silver paste or colloidal graphite. An anode lead 17 is connected to the anode 11 without interposing the dielectric film 12 and is partially coated with an insulator 16 so as to be isolated from the electrolyte coating 13. A space between the case 15 and the lead 17 is filled with an insulating adhesive 19.

DETAILED DESCRIPTION

As is well known, TCNQ has a planar molecular configuration and has a strong electron affinity. When TCNQ is mixed with or melted with another substance, TCNQ molecules tend to withdraw electrons from the latter substance thereby to be bonded with each other. If the latter substance molecules tend to release electrons, the released electrons are easily accepted by TCNQ molecules resulting in formation of ionic crystals. Compounds of TCNQ vary from those having typical ionic bond to those behaving like isolated ions, depending on the ionization potential values of the combining substance. They are generally called electron-donor-acceptor (EDA) compounds. Although these compounds have been noted as organic semiconductive materials based exclusively on their electronic conductivities, some of them have noticeable degrees of ionic conductivities and exhibit the remarkable property of participating in anodic oxidation.

A substance having a relatively low ionization potential is most suitable as a donor component for producing an ionic compound with TCNQ, and examples of such substances are aromatic diamines, ammonium, substituted ammoniums, aromatic onium compounds, and various metals. In a salt of TCNQ with an aromatic diamine, e.g., p-phenylenediamine, among these donor substances, the ion radicals of the respective components form a relatively weak ionic bond. On the other hand, the other cations form nearly perfect ionic bonds with TCNQ as represented e.g., by $NH_4^+TCNQ^-$ and $Ba^{2+}(TCNQ^-)_2$. These types of compounds are commonly called simple salts of TCNQ. There are other type of TCNQ compounds whose single molecule contains at least one molecule of neutral or nonionized TCNQ, e.g., $(triethylammonium)^+-TCNQ^-.TCNQ$ and $(pyridinium)^+TCNQ^-.TCNQ$, which are called complex salts and exhibit particularly high conductivities.

Among these simple and complex salts of TCNQ, the $(quinolinium)^+TCNQ^-.TCNQ$ and $(acridinium)^+TCNQ^-.TCNQ$ including derivatives of the respective donor components are preferred examples of semiconductive substances for use in the present invention. They are selected mainly for their high conductivities and superior effects on the anodic oxidation.

A high polymer to be used as a binder of the above TCNQ salts for producing the solid electrolyte coating 13 of FIG. 2 is required to dissolve or be miscible with the TCNQ salt thereby to form a homogeneous phase and at the same time to have a strong adhering property to the dielectric oxide film 12. Polymers of some nitrogen-containing compounds such as vinylpyridine, acrilonitrile, vinylpyrrolidone, vinylquinoline and vinylimidazole are known to dissolve TCNQ salts. (For example, the first two polymers are described in U.S. Pat. No. 3,483,438.) These polymers, however, show rather poor adhesion to the oxide film 12 and hence are not considered as satisfactory binders for practical capacitors. To overcome such a shortcoming, relatively large amounts of these polymer binders are used according to the prior arts as exemplified by U.S. Pat. No. 3,482,438, in which the polymer content in the electrolyte exceeds 50% by weight. As mentioned previously, important characteristics of solid electrolyte capacitors are adversely affected and even governed by physical properties of the polymer binder when a large polymer content is employed.

There are many high polymers having excellent adhering properties to the dielectric oxide film 12, and some monomers of such polymeric compounds can form copolymers with the above-mentioned nitrogen-containing polymerizable compounds. Examples of suitable monomers which form either strongly adhesive polymers or copolymers with the above nitrogen-containing compounds are vinyl acetate, vinyl ether, acrylate, methacrylate and butadiene. The present invention contemplates copolymers of these compounds, hereinafter referred to as the second component, and the above nitrogen-containing compounds (the first component) as the binder material for the electrolyte coating 13. Various combinations of the copolymers can serve the purpose of the invention and most preferable ones among them are: vinylpyrrolidone/vinyl acetate, vinylpyrrolidone/acrylate, acrylonitrile/methacrylate, acrylonitrile/vinyl acetate, acrylonitrile/vinyl ether, acrylonitrile/butadiene, vinylpyridine/vinyl acetate, vinylpyridine/butadiene, vinylquinoline/vinyl acetate and vinylimidazole/vinyl acetate. They can be prepared by the familiar processes for radical or ionic copolymerization. All of these copolymers dissolve or are compatible with the above described TCNQ salts and accomplish excellent adhesion of the electrolyte coating 13 to the dielectric oxide film 12 even when they amount to less than 40% by weight of the electrolyte.

The composition of the respective copolymers should be determined taking into consideration the effects thereof on the characteristics of the resulting electrolyte. Both the miscibility or compatibility of a copolymer with a TCNQ salt and the adhering property of the resulting electrolyte are almost solely dependent on the quantitative ratio of the two types of components. Some characteristics of the solid electrolyte capacitor 10 are adversely influenced when the amount of the second component is excessively increased to enhance the adhering property. According to the present invention, the amount of the second component is limited not to exceed 50% by weight of the copolymer.

The invention will be better understood from the following examples including results of several tests for comparison with prior art capacitors.

EXAMPLE 1

A solid electrolyte capacitor 10 as shown in FIGS. 1 and 2 was prepared. At first an aluminum foil anode 11 was electrolytically oxidized by a customary process to form a dielectric oxide film 12 thereon. (Quinolinium)$^+$TCNQ$^-$.TCNQ was employed as an organic semiconductive substance to serve as an electrolyte, and 100g of this complex salt and 10g of a 60/40 by weight copolymer of vinylpyrrolidone/vinyl acetate (referred to as P(VP/VAc)) were dissolved in 10l of acetonitrile. The copolymer was obtained by the familiar solution copolymerization technique using an alcohol as the solvent and $\alpha,\alpha'$-isobutylnitrile as a catalyst. The solvent may alternatively be an ester as is well known. The electrolyte solution was applied on the surface of the dielectric oxide film 12 and the coated anode assembly was heated at 100°C for several seconds to evaporate the solvent and the procedures were repeated several times thereby to obtain a solid electrolyte coating 13. Thereafter the case 15 and the aluminum cathode lead 18 were furnished by the usual method. An epoxy resin was used as the insulator 16 and the filler 19. For comparison, another capacitor of the same construction except that polyvinylpyrrolidone (PVP) was used as the electrolyte binder instead of P(VP/VAc).

The capacitance, dielectric loss and leakage current of the two capacitors were measured and the results were as follows.

Table 1

| Binder | Capacitance ($\mu$F) | Loss ($\mu$F.$\Omega$) | Leakage current ($\mu$A) |
| --- | --- | --- | --- |
| P(VP/VAc) | 0.81 | 16 | less than 0.01 |
| PVP | 0.82 | 26 | 0.01 |

Figure 3:
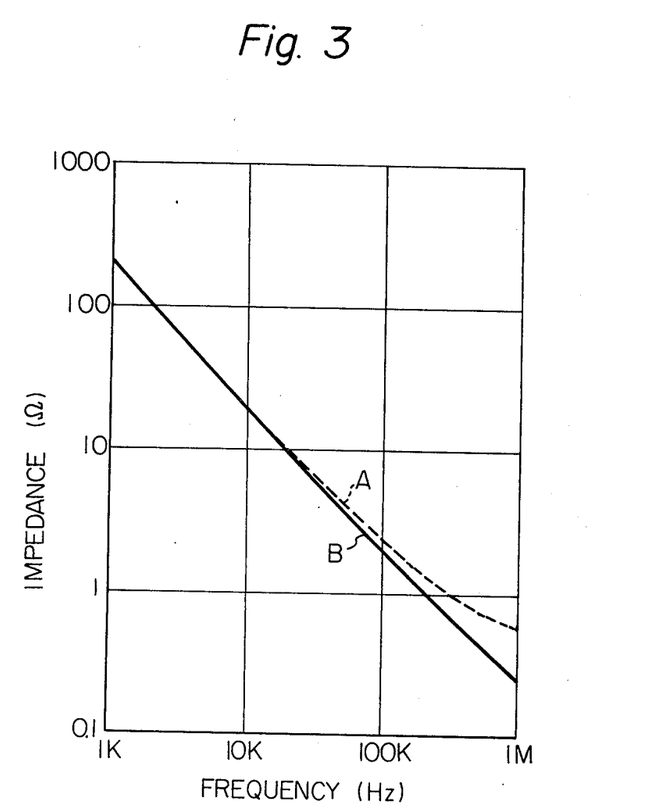
FIG. 3 is a graph showing the frequency response of impedance with respect to a capacitor according to the invention and another capacitor of the same construction but utilizing a prior art electrolyte.

Also the frequency response of impedance was measured and the results are shown in FIG. 3, in which the curve A represents the prior art capacitor of PVP binder and the curve B the novel capacitor of P(VP/VAc) binder. The capacitor of the invention exhibits a quite flat frequency characteristic.

Figure 4:
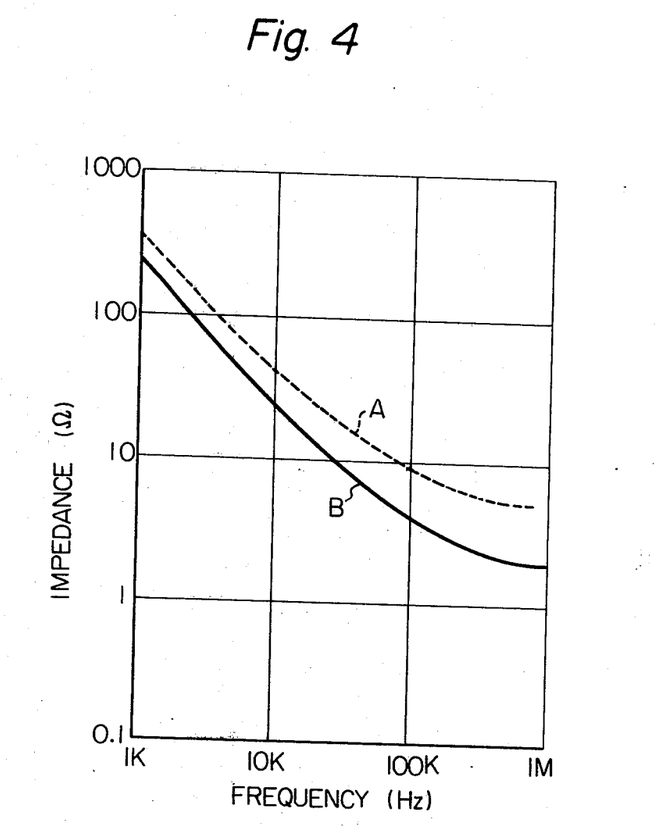
FIGS. 4 and 5 are similar graphs but showing the characteristics after a heat test and a life test, respectively.

Then the two capacitors were subjected to a heat test. The above characteristics were measured again after storing the capacitors in the atmosphere of 150°C for a period at 10 hr at no load. The results are shown in Table 2 and FIG. 4, in which the curves A and B represents the same capacitors or binders as in FIG. 3, respectively.

Table 2

| Binder | Capacitance ($\mu$F) | Loss ($\mu$F.$\Omega$) | Leakage current ($\mu$A) |
| --- | --- | --- | --- |
| P(VP/VAc) | 0.70 | 26 | less than 0.01 |
| PVP | 0.45 | 130 | 0.01 |

These results clearly illustrate the remarkable endurance and stability of the electrolyte or binder of the invention at high temperatures.

Figure 5:
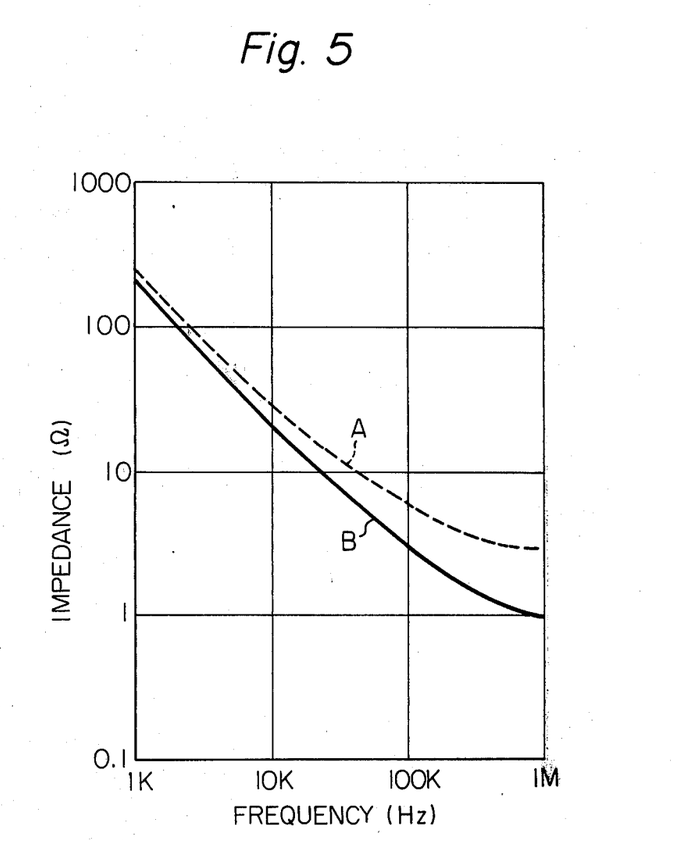

Several respective capacitors according to Example 1 were newly prepared and were maintained in a 85°C atmosphere for 500 hr at 25V load. The results of measurements after this life test are shown in Table 3 and FIG. 5, in which the meaning of the curves A and B is the same as in FIGS. 3 and 4. Thus, the electrolyte containing P(VP/VAc) brought about a noticeably long life of the capacitor with excellent stability. It was found that random failure probabilities of the capacitors during the above life test were in the order of 1/10 to 1/20 with respect to the PVP binder capacitors but almost nil with respect to the P(VP/VAc) binder capacitors.

Table 3

| Binder | Capacitance ($\mu$F) | Loss ($\mu$F.$\Omega$) | Leakage current ($\mu$A) |
| --- | --- | --- | --- |
| P(VP/Ac) | 0.76 | 21 | less than 0.01 |
| PVP | 0.64 | 88 | 0.01 |

EXAMPLE 2

Example 1 was repeated except that the composition of the P(VP/VAc) was altered as follows to examine the effects of the composition on the capacitor characteristics. The quantitative ratio of vinylpyrrolidone to vinyl acetate was altered to 70/30, 50/50 and 30/70. The capacitance and loss of the resulting capacitors varied as follows.

Table 4

| VP/VAc | Capacitance (μF) | Loss (μF.Ω) |
|---|---|---|
| 70/30 | 0.91 | 16 |
| 50/50 | 0.73 | 18 |
| 30/70 | 0.18 | 48 |

These results show that a copolymer for preparing an electrolyte according to the invention must contain at least 50% of the first component, a selected nitrogen-containing compound such as vinylpyrrolidone in this Example. A solid electrolyte capacitor can be obtained even when the amount of the first component is decreased up to 30% as is proven by this Example, but such a capacitor has only an extremely small capacitance and shows a large loss value. The amount of the first component in a copolymer for use in the invention is preferably from about 60 to about 80% by weight irrespective of the combination of the two components.

EXAMPLE 3

Example 1 was again repeated except that the TCNQ salt was altered to (N-(n-propyl)quinolinium)$^+$TCNQ$^-$.TCNQ and that the electrolyte solution was prepared by dissolving 100g of this TCNQ salt and 5g of 60/40 P(VP/VAc) in 10l of acetone. A comparative capacitor was prepared by the use of PVP binder. The characteristics of the two capacitors were as follows.

Table 5

| Binder | Capacitance (μF) | Loss (μF.Ω) | Leakage current (μA) |
|---|---|---|---|
| P(VP/VAc) | 0.38 | 27 | less than 0.01 |
| PVP | 0.34 | 43 | 0.01 |

Then the two capacitors were kept in a 150°C atmosphere for 10 hr at no load and the characteristics varied as follows.

Table 6

| Binder | Capacitance (μF) | Loss (μF.Ω) | Leakage current (μA) |
|---|---|---|---|
| P(VP/VAc) | 0.21 | 44 | less than 0.01 |
| PVP | 0 | ∞ | — |

As seen from Table 6, the capacitor having the electrolyte composed of (N-(n-propyl)quinolinium)$^+$TCNQ$^-$.TCNQ and PVP was completely destroyed by the above heat test.

EXAMPLE 4

(Pyridinium)$^+$TCNQ$^-$.TCNQ and a 60/40 copolymer of vinylpyridine and butadiene were employed as the semiconductive substance and binder, respectively. The electrolyte solution was prepared by dissolving 100g of the TCNQ complex salt and 15g of the binder in 10l of acetonitrile. A solid electrolyte capacitor was produced in accordance with the procedures of Example 1 and showed following characteristics.

| Capacitance: | 0.6 μF |
|---|---|
| Loss: | 20 μF.Ω |

EXAMPLE 5

Aluminum anode samples were etched and anodized to form dielectric oxide films thereon. Each oxide films was coated with an electrolyte layer in accordance with the procedures of Example 1 except that the composition of P(VP/VAc) was 70/30 by weight and that the amount of the copolymer to the fixed amount of the TCNQ salt was varied in a wide range.

Figure 6:
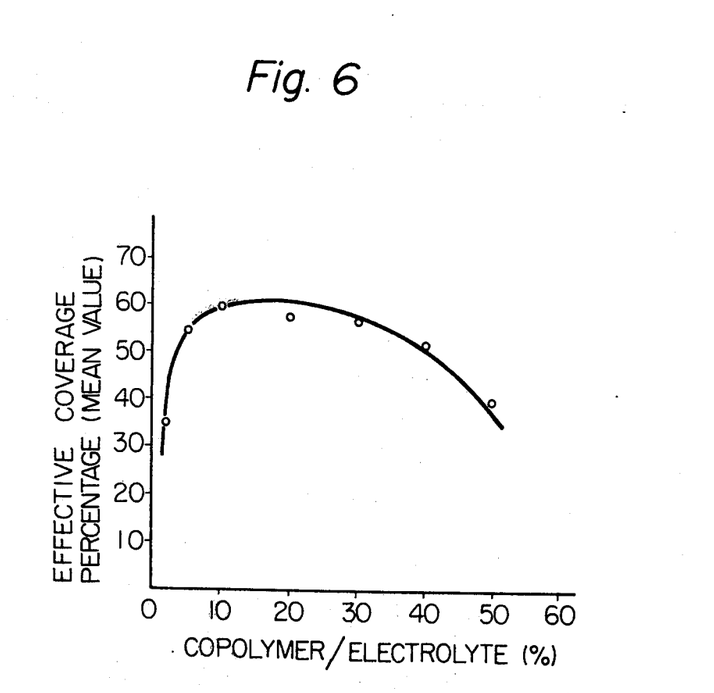
FIG. 6 is a graph showing the relationship between the copolymer content in an electrolyte layer and effective coverage percentage of a dielectric film with the electrolyte layer.

The effective coverage percentage of the oxide film with the resulting electrolyte coating was measured for each sample and the results are presented in FIG. 6. A coverage percentage of 100% means a perfect or ideal coverage of the entire surface of the oxide film including micropores thereon. As seen from the graph, a good coverage was accomplished when the copolymer content in the electrolyte coating was relatively small, or between 5 and 40%. When, however, the copolymer was decreased to less than about 5%, the coverage percentage showed a sharp reduction. Generally similar tendencies were observed with respect to the other copolymers. Consequently, the amount of a copolymer in the electrolyte according to the invention is preferably in the range between 5 and 40% by weight of the total electrolyte composition.

It is apparent from the above Examples that a solid electrolyte capacitor of the invention realizes an extremely small dielectric loss and leakage current owing to its novel electrolyte coating containing the above described copolymer binder. The capacitor has further advantages such as excellent stability of capacitance, dielectric loss and frequency response of impedance, particularly in high frequency ranges, at high temperatures and/or during long use. Furthermore, reduction in the leakage current leads to a remarkable decrease in failure rate of the capacitor.

Thus the present invention succeeds in providing a practicable and improved solid electrolyte capacitor which can be produced at a relatively low cost and with a good yield.

What is claimed is:

1. In a solid electrolyte capacitor having a dielectric oxide film formed on a first electrode of an anodically oxidizable metal, a second electrode and a solid electrolyte layer formed between and in intimate contact with both electrodes, the solid electrolyte consisting of a semiconductive salt of 7,7,8,8-tetracyanoquinodimethane (TCNQ) and a binder, wherein said binder is a copolymer of 60 to 80 wt % of first component and the remaining amount of second of second component, the polymer of said first component being capable of dissolving said salt of TCNQ and the polymer of said second component having strong adhering property to said dielectric oxide film.

2. The capacitor as claimed in claim 1, wherein said first component of said binder copolymer is a, polymerizable nitrogen-containing monomer compound selected from the group consisting of vinyl pyrrolidone, vinylpyridine, vinylquinoline, vinylimidazole and acrylonitrile and wherein said second component is a polymerizable monomer compound selected from the group consisting of vinyl acetate, vinyl ether, acrylates, methacrylates and butadiene.

3. The capacitor as claimed in claim 2, wherein said copolymer is selected from the group consisting of copolymers of vinyl pyrrolidone-vinyl acetate, and vinyl pyrrolidone-vinyl acrylate.

4. The capacitor as claimed in claim 1, wherein said TCNQ salt is selected from the group consisting of TCNQ salts of quinoline, acridine and alkyl-substituted heterocyclic cations and their derivatives.

5. The capacitor as claimed in claim 1, wherein said solid electrolyte contains 5 to 40% by weight of said copolymer.

6. The capacitor as claimed in claim 2 wherein said copolymer is selected from the group consisting of vinyl pyridine-vinyl acetate, and vinyl pyridine-butadiene.

7. The capacitor as claimed in claim 2 wherein said copolymer is vinyl quinoline-vinyl acetate.

8. The capacitor as claimed in claim 2 wherein said copolymer is vinyl imidazole-vinyl acetate.

9. The capacitor as claimed in claim 2, wherein the said copolymer selected from the group consisting of copolymers of acrylonitrile-vinyl acetate, acrylonitrile-vinyl ether, acrylonitrile-butadiene and acrylonitrile-methacrylate.

* * * * *